United States Patent Office
3,639,443
Patented Feb. 1, 1972

3,639,443
4-PHENYLBICYCLO[2.2.2]OCT-2-EN-1-YL URETHANS
Walter A. Gregory and James C. Kauer, Wilmington, Del., assignors to E. I. du Pont de Nemours and Company, Wilmington, Del.
No Drawing. Continuation-in-part of application Ser. No. 467,753, June 28, 1965, now Patent No. 3,413,348. This application Jan. 26, 1968, Ser. No. 700,695
Int. Cl. C07c 125/06
U.S. Cl. 260—471 C  2 Claims

ABSTRACT OF THE DISCLOSURE 4-phenylbicyclo[2.2.2]oct-2-en-1-yl urethans as intermediates in the preparation of phenylbicyclo[2.2.2]oct-2-ene-1-amines.

Preparation of the 4-phenylbicyclo[2.2.2]oct-2-en-1-yl urethans by a modified Curtius reaction.

CROSS-REFERENCE TO RELATED APPLICATION

This application is a continuation-in-part of co-pending U.S. application Ser. No. 467,753, filed June 28, 1965, now U.S. Pat. No. 3,413,348.

BACKGROUND OF THE INVENTION

The 4-phenylbicyclo[2.2.2]oct-2-en-1-yl urethans of this invention are intermediates in the preparation of the phenylbicyclo[2.2.2]oct-2-ene-amines of the above named application. These phenylbicyclo[2.2.2]oct-2-ene-amines made from the phenylbicyclo[2.2.2]oct-2-en-1-yl urethans of this invention can be used to produce antidepressant effect in warm-blooded animals.

The synthesis of the compounds of this invention starts with 4-phenylbicyclo[2.2.2]oct-2-en-1-carboxylic acids. The starting material acids can be prepared through the addition of ethylene to the appropriate 6-phenyl-α-pyrone-3-carboxylate or to the appropriate 3-phenyl-α-pyrone-6-carboxylate followed by alkaline hydrolysis.

Organic chemical literature describes the preparation of the α-pyrones and the methods that are useful for the production of aromatic substituted α-pyrones. The following references give detailed procedures for the preparation of α-pyrones: Kochetkov et al., J. Gen. Chem. USSR (English translation) 26, 643 (1956), 27, 277 (1957), and 28, 1562 (1958) and 28, 2484 (1958) from acid chlorides; Wiley and Hart, J. Am. Chem. Soc. 76, 1942 (1959); Windholz et al., J. Org. Chem. 28, 1443 (1963); and Higgenbotham and Lapworth, J. Chem. Soc. 123, 1325 (1923). By the use of the above general processes with available starting materials, phenyl and substituted phenyl pyrones are easily produced.

SUMMARY OF THE INVENTION

We have discovered that 4-phenylbicyclo[2.2.2]oct-2-en-1-yl urethane can be used to prepare 4-phenylbicyclo[2.2.2]oct-2-en-1-amines. For the purposes of this invention the term 4-phenylbicyclo[2.2.2]oct-2-en-1-yl urethans includes 4-phenyl and 4-(substituted-phenyl)bicyclo[2.2.2]oct-2-en-1-yl urethan wherein the ester moiety is an alkyl of 1 through 8 carbons and phenyl. The compounds of this invention have the formula (1)

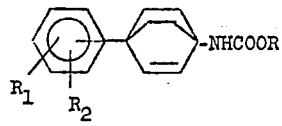

where R is alkyl of 1 through 8 carbons or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4, preferably 1 through 2 carbons, carboxy, or alkoxycarbonyl where the alkyl group has 1 through 2 carbons.

Where applicable, salts of non-toxic anions will be included.

DESCRIPTION OF THE PREFERRED EMBODIMENTS

Of the compounds of this invention the most preferred are those compounds of Formula 1 where R is alkyl of 1 through 4 carbons and $R_1$ and $R_2$ are hydrogen.

Illustrative of the compounds of this invention are the following:

Methyl N-4-phenylbicyclo[2.2.2]oct-2-en-1-yl urethan
Ethyl N-4-(p-tolyl)bicyclo[2.2.2]oct-2-en-1-yl urethan
Ethyl N-4-(p-ethylphenyl)bicyclo[2.2.2]oct-2-en-1-yl urethan
Butyl N-4-(p-fluorophenyl)bicyclo[2.2.2]oct-2-en-1-yl urethan
Isopropyl N-4-(p-chlorophenyl)bicyclo[2.2.2]oct-2-en-1-yl urethan
n-Octyl N-4-(p-bromophenyl)bicyclo[2.2.2]oct-2-en-1-yl urethan
n-Propyl N-4-(p-cyanophenyl)bicyclo[2.2.2]oct-2-en-1-yl urethan
Phenyl N-4-phenylbicyclo[2.2.2]oct-2-en-1-yl urethan
Methyl N-4-(p-nitrophenyl)bicyclo[2.2.2]oct-2-en-1-yl urethan
Ethyl N-4-(p-trifluoromethylphenyl)bicyclo[2.2.2]oct-2-en-1-yl urethan
Ethyl N-4-(p-methoxyphenyl)bicyclo[2.2.2]oct-2-en-1-yl urethan
Methyl N-4-(p-methoxycarbonylphenyl)bicyclo[2.2.2]oct-2-en-1-yl urethan
Ethyl N-4-(p-ethoxycarbonylphenyl)bicyclo[2.2.2]oct-2-en-1-yl urethan
Ethyl N-4-(m-tolyl)bicyclo[2.2.2]oct-2-en-1-yl urethan
Ethyl N-4-(m-fluorophenyl)bicyclo[2.2.2]oct-2-en-1-yl urethan
Methyl N-4-(m-chlorophenyl)bicyclo[2.2.2]oct-2-en-1-yl urethan
Isopropyl N-4-(m-chlorophenyl)bicyclo[2.2.2]oct-2-en-1-yl urethan
Phenyl N-4-(m-chlorophenyl)bicyclo[2.2.2]oct-2-en-1-yl urethan
Methyl N-4-(m-bromophenyl)bicyclo[2.2.2]oct-2-en-1-yl urethan
Methyl N-4-(m-nitrophenyl)bicyclo[2.2.2]oct-2-en-1-yl urethan
Methyl N-4-(m-methoxyphenyl)bicyclo[2.2.2]oct-2-en-1-yl urethan
Butyl N-4-(m-methoxyphenyl)bicyclo[2.2.2]oct-2-en-1-yl urethan
Methyl N-4-(m-methoxycarbonylphenyl)bicyclo[2.2.2]oct-2-en-1-yl urethan
Methyl N-4-(m-ethoxycarbonylphenyl)bicyclo[2.2.2]oct-2-en-1-yl urethan
Methyl N-4-(m-trifluoromethylphenyl)bicyclo[2.2.2]oct-2-en-1-yl urethan
Ethyl N-4-(m-trifluoromethylphenyl)bicyclo[2.2.2]oct-2-en-1-yl urethan
Ethyl N-4-(o-tolyl)bicyclo[2.2.2]oct-2-en-1-yl urethan
Isopropyl N-4-(o-tolyl)bicyclo[2.2.2]oct-2-en-1-yl urethan
Octyl N-4-(o-tolyl)bicyclo[2.2.2]oct-2-en-1-yl urethan
Ethyl N-4-(o-fluorophenyl)bicyclo[2.2.2]oct-2-en-1-yl urethan Propyl N-4-(o-chlorophenyl)bicyclo[2.2.2]oct-2-en-1-yl urethan
Pentyl N-4-(o-bromophenyl)bicyclo[2.2.2]oct-2-en-1-yl urethan
Phenyl N-4-(o-nitrophenyl)bicyclo[2.2.2]oct-2-en-1-yl urethan
Ethyl N-4-(2,4-dimethylphenyl)bicyclo[2.2.2]oct-2-en-1-yl urethan
Propyl N-4-(3,5-dimethylphenyl)bicyclo[2.2.2]oct-2-en-1-yl urethan
Ethyl N-4-(3,4-dimethylphenyl)bicyclo[2.2.2]oct-2-en-1-yl urethan
Butyl N-4-(3-bromo-4-methoxyphenyl)bicyclo[2.2.2]oct-2-en-1-yl urethan
Ethyl N-4-(3-nitro-4-methoxyphenyl)bicyclo[2.2.2]oct-2-en-1-yl urethan
MethylN-4-(2,4-dimethylphenyl)bicyclo[2.2.2]oct-2-en-1-yl urethan
Methyl 4-(4-ethyl-2-methylphenyl)bicyclo[2.2.2]oct-2-en-1-yl urethan
Methyl 4-(2,4-diethylphenyl)bicyclo[2.2.2]oct-2-en-1-yl urethan
Methyl 4-(p-aminophenyl)bicyclo[2.2.2]oct-2-en-1-yl urethan
Methyl 4-(p-methylaminophenyl)bicyclo[2.2.2]oct-2-en-1-yl urethan
Methyl 4-(p-dimethylaminophenyl)bicyclo[2.2.2]oct-2-en-1-yl urethan The compounds of Formula 1 are prepared by converting a 4 - phenyl or 4 - (substituted-phenyl)bicyclo[2.2.2]oct-2-en-1-carboxylic acid to the desired 4-phenyl or 4-(substituted-phenyl)urethan by a modified Curtis reaction [J. Org. Chem. 26, 3511 (1961)] in which a mixed anhydride of the acid is formed with ethyl chloroformate and is then treated with sodium azide to form the acid azide. The acid azide is heated in toluene to cause rearrangement to the isocyanate, which is treated with an alcohol to form a urethan of this invention.

The urethan produced in the above reaction can then be hydrolyzed to yield the 4-phenyl or 4-(substituted-phenyl)bicyclo[2.2.2]oct-2-en-1-amine. The 4-phenyl and 4-(substituted-phenyl)bicyclo[2.2.2]oct-2-en - 1 - amine products are useful as antidepressant agents in warm-blooded animals. There is also some indication that some of the urethans of this invention can be used to produce antidepressant effect in animals in addition to their usefulness as intermediates for preparing the 4-phenyl and 4-(substiuted-phenyl)bicyclo[2.2.2]oct-2-en-1-amines.

This invention will be better understood by reference to the following illustrative examples in which parts and percentages are by weight unless otherwise indicated.

Example 1

A solution of 16 ml. (11.6 g., 0.115 mole) of triethylamine in 100 ml. of acetone is added to a stirred mixture of 22.8 g. (0.10 mole) of 4-phenylbicyclo[2.2.2]oct-2-en-1-carboxylic acid and 300 ml. of acetone. This solution is cooled to —5 to 0° C. and a solution of 12.0 g. (0.11 mole) of ethyl chloroformate in 50 ml. of acetone is added dropwise, with cooling, at a rate such that the temperature does not rise above 0° C. When the addition is complete, stirring is continued for 30 min., and a solution of 9.8 g. (0.15 mole) of sodium azide in 30 ml. of water is added dropwise at —5 to 0° C. After addition is complete, stirring is continued for 1 hour. The cold solution is diluted with ice water and extracted with toluene. The toluene solution is dried with anhydrous magnesium sulfate, filtered, and heated on a steam bath until the evolution of nitrogen is complete. Then, 100 ml. of methanol and 0.5 g. of "Dabco" (1,4-diazabicyclo-[2.2.2]octane) are added and the mixture is heated at reflux for 30 min. On cooling, the solution yields methyl N-4-phenylbicyclo[2.2.2]oct-2-en-1-yl urethan.

The urethan is hydrolyzed by refluxing it with 500 ml. of 10% sodium hydroxide solution for 16 hours. The mixture is allowed to cool and then is extracted with ether. The ether extract is dried with anhydrous potassium carbonate and filtered. The ether solution is treated with anhydrous hydrogen chloride to give a precipitate, which is filtered, washed with ether, and dried. The precipitate is 4-phenylbicyclo[2.2.2]oct-2-en-1-amine hydrochloride.

Examples 2–23

The procedure of Example 1 is repeated but substituting an equivalent amount of the indicated "Acid" for the 4-phenylbicyclo[2.2.2]oct-2-ene-1-carboxylic acid of Example 1 to produce the indicated "Urethan" of this invention.

| Ex. | Acid | Urethan |
| --- | --- | --- |
| 2 | 4-(p-nitrophenyl)bicyclo[2.2.2]oct-2-ene-1-carboxylic acid. | Methyl N-4-(p-nitrophenyl)bicycol[2.2.2]oct-2-en-1-yl urethan. |
| 3 | 4-(p-trifluoromethylphenyl)bicyclo[2.2.2]oct-2-ene-1-carboxylic acid. | Methyl N-4-(p-trifluoromethylphenyl)bicyclo-[2.2.2]oct-2-en-1-yl urethan. |
| 4 | 4-(p-methoxyphenyl)bicyclo[2.2.2]oct-2-ene-1-carboxylic acid. | Methyl N-4-(p-methoxyphenyl)bicyclo[2.2.2]-oct-2-en-1-yl urethan. |
| 5 | 4-(p-methoxycarbonylphenyl)bicyclo[2.2.2]oct-2-ene-1-carboxylic acid. | Methyl N-4-(p-methoxycarbonylphenyl)bicyclo[2.2.2]ocg-2-en-1-yl urethan. |
| 6 | 4-(p-ethoxycarbonylphenyl)bicyclo[2.2.2]oct-2-ene-1-carboxylic acid. | Methyl N-4-(p-ethoxycarbonylphenyl)bicyclo[2.2.2]oct-2-en-1-yl urethan. |
| 7 | 4-(m-tolyl)bicyclo[2.2.2]oct-2-ene-1-carboxylic acid. | Methyl N-4-(m-tolyl)bicyclo[2.2.2]oct-2-en-1-yl urethan. |
| 8 | 4-(m-fluorophenyl)bicyclo[2.2.2]oct-2-ene-1-carboxylic acid. | Methyl N-4-(m-fluorophenyl)bicyclo[2.2.2]-oct-2-en-1-yl urethan. |
| 9 | 4-(m-chlorophenyl)bicyclo[2.2.2]oct-2-ene-1-carboxylic acid. | Methyl N-4-(m-chlorophenyl)bicyclo[2.2.2]oct-2-en-1-yl urethan. |
| 10 | 4-(m-bromophenyl)bicyclo[2.2.2]oct-2-ene-1-carboxylic acid. | Methyl N-4-(m-bromophenyl)bicyclo[2.2.2]oct-2-en-1-yl urethan. |
| 11 | 4-(m-nitrophenyl)bicyclo[2.2.2]oct-2-ene-1-carboxylic acid. | Methyl N-4-(m-nitrophenyl)bicyclo[2.2.2]oct-2-en-1-yl urethan. |
| 12 | 4-(m-methox phenyl)bicyclo[2.2.2]oct-2-ene-1-carboxylic acid. | Methyl N-4-(m-methoxyphenyl)bicyclo[2.2.2]oct-2-en-1-yl urethan. |
| 13 | 4-(m-methoxycarbonylphenyl)bicyclo[2.2.2]oct-2-ene-1-carboxylic acid. | Methyl N-4-(m-methoxycarbonylphenyl)bicyclo[2.2.2]oct-2-en-1-yl urethan. |
| 14 | 4-(m-trifluoromethylphenyl)bicyclo[2.2.2]oct-2-ene-1-carboxylic acid. | Methyl N-4-(m-trifluoromethylphenyl)bicyclo[2.2.2]oct-2-en-1-yl urethan. |
| 15 | 4-(o-tolyl)bicyclo[2.2.2]oct-2-ene-1-carboxylic acid. | Methyl N-4-(o-tolyl)bicyclo[2.2.2]oct-2-en-1-yl urethan. |
| 16 | 4-(o-fluorophenyl)bicyclo[2.2.2]oct-2-ene-1-carboxylic acid. | Methyl N-4-(o-fluorophenyl)bicyclo[2.2.2]oct-2-en-1-yl urethan. |
| 17 | 4-(o-chlorophenyl)bicyclo[2.2.2]oct-2-ene-1-carboxylic acid. | Methyl N-4-(o-chlorophenyl)bicyclo[2.2.2]oct-2-en-1-yl urethan. |
| 18 | 4-(o-bromophenyl)bicyclo[2.2.2]oct-2-ene-1-carboxylic acid. | Methyl N-4-(o-bromophenyl)bicyclo[2,2.2]oct-2-en-1-yl urethan. |
| 19 | 4-(o-nitrophenyl)bicyclo[2.2.2]oct-2-ene-1-carboxylic acid. | Methyl N-4-(o-nitrophenyl)bicyclo[2.2.2]oct-2-en-1-yl urethan. |
| 20 | 4-(2,4-dimethylphenyl)bicyclo[2.2.2]oct-2-ene-1-carboxylic acid. | Methyl N-4-(2,4-dimethylphenyl)bicyclo[2.2.2]oct-2-en-1-yl urethan. |
| 21 | 4-(3,5-dimethylphenyl)bicyclo[2.2.2]oct-2-ene-1-carboxylic | Methyl N-4-(3,5-dimethylphenyl)bicyclo[2.2.2]oct-2,en-1-yl urethan. |
| 22 | 4-(3,4-dimethoxyphenyl)bicyclo[2.2.2]oct-2-ene-1-carboxylic acid. | Methyl N-4-(3,4-dimethoxyphenyl)bicyclo[2.2.2]oct-2-en-1-yl urethan. |
| 23 | 4-(3-bromo-4-methoxyphenyl)bicyclo[2.2.2]oct-2-ene-1-carboxylic acid. | Methyl N-4-(3-bromo-4-methoxyphenyl)bicyclo[2.2.2]oct-2-en-1-yl urethan. |

Examples 24–32

The procedure of Example is repeated but substituting an equivalent amount of the indicated "Acid" for the 4-phenylbicyclo[2.2.2]oct-2-ene-1-carboxylic acid and the indicated "Alcohol" for the methanol of Example 1 to produce the indicated "Urethan" of this invention.

| Ex. | Acid | Alcohol | Urethan |
|---|---|---|---|
| 24 | 4-(p-tolyl)bicyclo[2.2.2]oct-2-ene-1-carboxylic acid. | Ethanol | Ethyl N-4-(p-tolyl)-bicyclo[2.2.2]oct-2-en-1-yl urethan. |
| 25 | 4-(p-ethylpehnyl)bicyclo[2.2.2]oct-2-ene-1-carboxylic acid. | do | Ethyl N-4-(p-ethylphenyl)bicyclo[2.2.2]oct-2-en-1-yl urethan. |
| 26 | 4-(p-fluorophenyl)bicyclo[2.2.2]oct-2-ene-1-carboxylic acid. | n-Butanol | n-Butanol N-4-(p-fluorophenyl)bicyclo[2.2.2]oct-2-en-1-yl urethan. |
| 27 | 4-(p-chlorophenyl)bicyclo[2.2.2]oct-2-ene-1-carboxylic acid. | Isopropanol | Isopropyl N-4-(p-chlorophenyl)bicyclo[2.2.2]oct-2-en-1-yl urethan. |
| 28 | 4-(p-bromophenyl)bicyclo[2.2.2]oct-2-ene-1-carboxylic acid. | n-Octanol | n-Octyl N-4-(p-bromophenyl)bicyclo[2.2.2]oct-2-en-1-yl urethan. |
| 29 | 4-(p-cyanophenyl)bicyclo[2.2.2]oct-2-ene-1-carboxylic acid. | n-Propanol | n-Propyl N-4-(p-cyanophenyl)bicyclo[2.2.2]oct-2-en-1-yl urethan. |
| 30 | 4-phenylbicyclo[2.2.2]oct-2-ene-1-carboxylic acid. | Phenol | Phenyl N-4-phenylbicyclo[2.2.2]oct-2-en-1-yl urethan. |
| 31 | 4-(m-ethoxycarbonylphenyl)bicyclo[2.2.2]oct-2-ene-1-carboxylic acid. | Ethanol | Ethyl N-4-(m-ethoxycarbonylphenyl)bicyclo[2.2.2]oct-2-en-1-yl urethan. |

The urethans as prepared in Examples 2–31 can readily be converted to the corresponding 4 - phenylbicyclo-[2.2.2]oct-2-ene-1-amine salts according to the procedure of Example 1 by alkaline hydrolysis with a base such as soduim hydroxide followed by acidification to precipitate the amine salt from solution.

As hereinbefore discussed, the 4-phenyl and 4-(substituted-phenyl)bicyclo[2.2.2]oct-2-ene-1-yl urethans are useful as intermediates in the preparation of pharmaceutically active 4-phenyl and 4-(substiuted-phenyl)bicyclo-[2.2.2]oct-2-ene-1-amines. The contents of our copending application, U.S. application Ser. No. 467,753, filed June 28, 1965 now U.S. Pat. No. 3,413,348, is incorporated herein to provide a more complete description of the preparation and utilization of said pharmaceutically active 4-phenyl and 4-(substituted-phenyl)bicyclo[2.2.2] oct-2-ene-1-amines.

We claim:
1. A compound of the formula

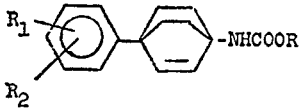

where
R is alkyl of 1 through 8 carbons and phenyl; and
$R_1$ and $R_2$ are hydrogen, methyl, ethyl, chlorine, bromine, fluorine, nitro, amino, lower dialkylamino, cyano, alkoxy of 1 through 4 carbons and alkoxycarbonyl where the alkyl contains from 1 through 2 carbons.

2. A compound of the formula

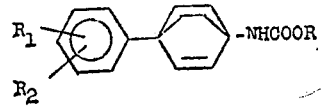

where
R is alkyl of 1 through 4 carbons; and
$R_1$ and $R_2$ are hydrogen.

References Cited

UNITED STATES PATENTS 3,422,104   1/1969   Schöter et al. _____ 260—326.3

LORRAINE A. WEINBERGER, Primary Examiner

L. A. THAXTON, Assistant Examiner

U.S. Cl. X.R.

260—465 D